INVENTORS.
ALEX W. FRANCIS JR.
CHARLES O. MEYERS
BY
ATTORNEY

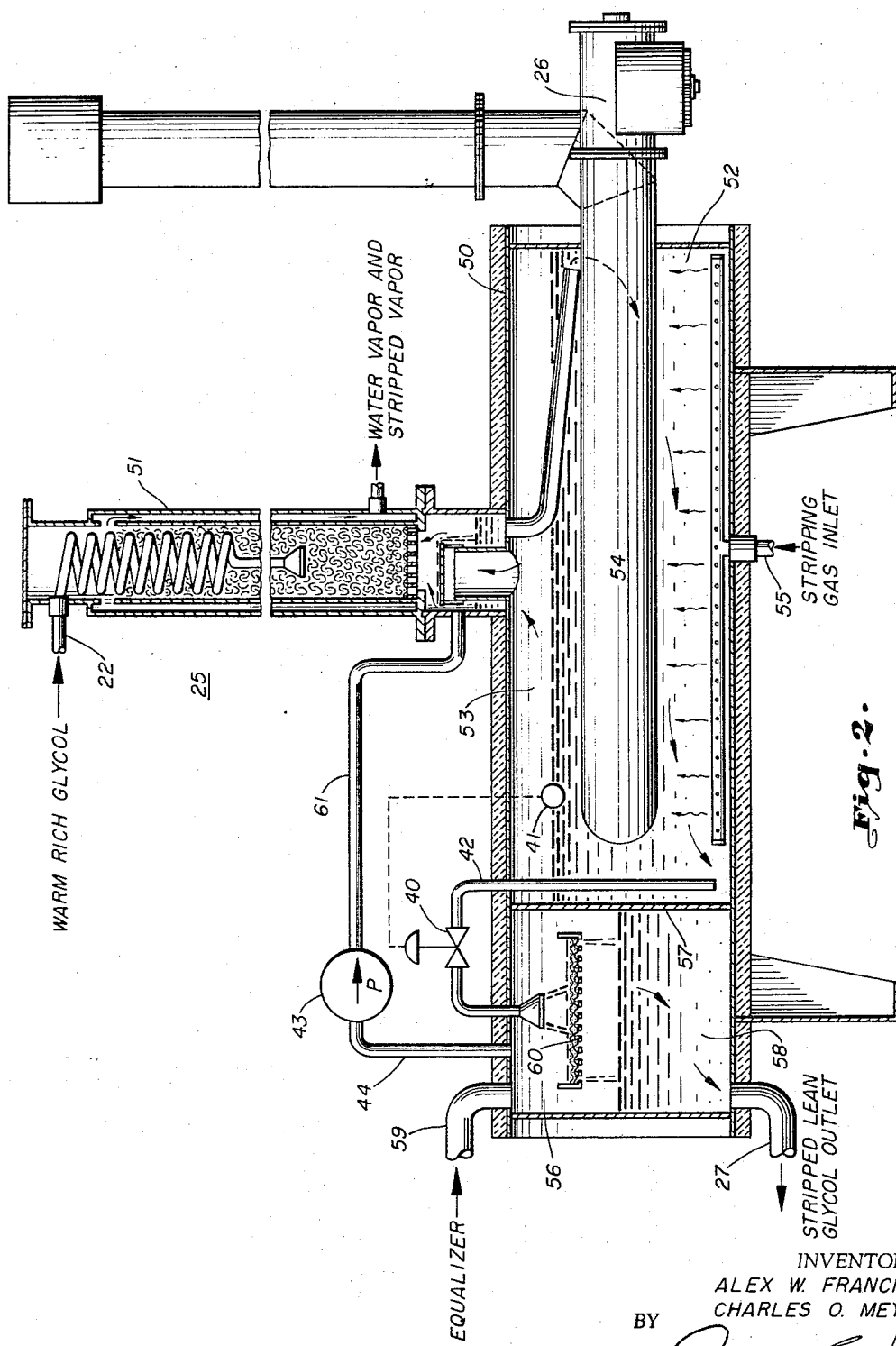

United States Patent Office 3,370,636
Patented Feb. 27, 1968

3,370,636
APPARATUS FOR RECONCENTRATING
LIQUID DESICCANT
Alex W. Francis, Jr., and Charles O. Meyers, Tulsa, Okla., assignors, by mesne assignments, to Combustion Engineering, Inc., a corporation of Delaware
Continuation of application Ser. No. 415,983, Dec. 4, 1964. This application Feb. 3, 1967, Ser. No. 613,971
5 Claims. (Cl. 159—16)

ABSTRACT OF THE DISCLOSURE

A system for reconcentrating a diluted liquid desiccant comprises an indirectly heated vessel fed with a diluted desiccant into the larger of two pressure isolated, horizontally juxtaposed compartments. The larger compartment is indirectly heated and releases vapor. Concentrated desiccant under control of the liquid level in the larger compartment is fed to the smaller compartment as a result of the vacuum therein produced by a pump which removes flashed water vapor and desiccant vapor from the smaller compartment from which concentrate is removed.

---

Figure 1:
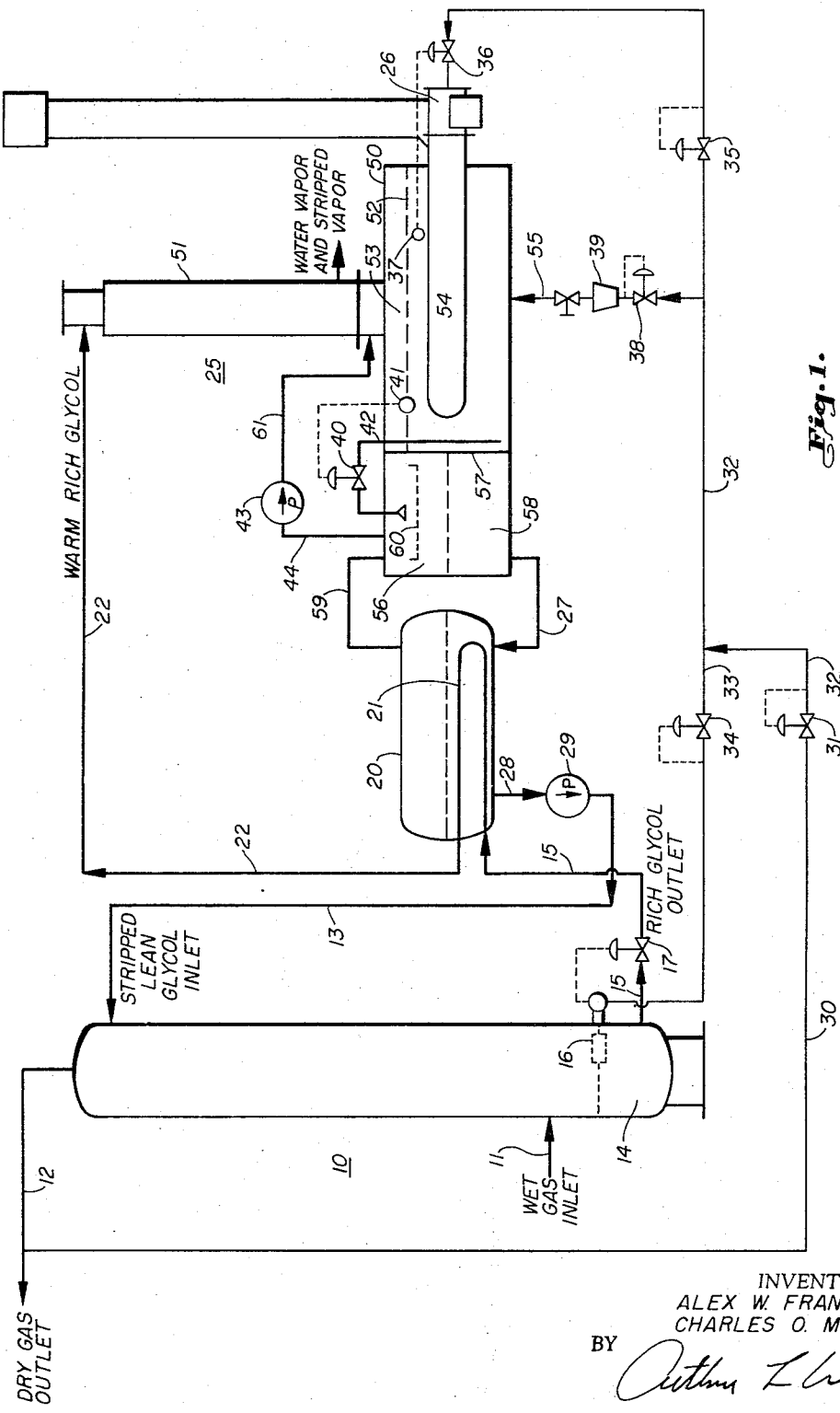

This application is a continuation of S.N. 415,983 filed Dec. 4, 1964, now abandoned.

The present invention relates to a system for reconcentrating liquid desiccant. More specifically, the invention relates to the reconcentrating of liquid desiccant with heat and/or gas undersaturated with water vapor and/or by vacuum.

Liquid desiccants, such as the glycols, are quite useful in dehydrating natural gas streams. A contactor tower is normally provided in which liquid desiccant is brought into intimate contact with the natural gas stream to be dehydrated. The desiccant, enriched by the water, is removed from the gas stream and then normally reconcentrated by boiling off the water with heat. The desiccant is then recirculated through the contactor vessel in a continuous operation.

There is a limit to the temperature to which commercially available liquid desiccants may be heated to reconcentrate them. Above this limit, the liquid desiccant begins to deteriorate, or break down, chemically. Unfortunately, the upper temperature limit established by the danger of chemical decomposition of liquid desiccant does not permit all the water to be driven out of the desiccant by heat alone.

By heat alone, triethylene glycol can be reconcentrated to about 98.5 percent by weight when its temperature level is at 380 degrees F. For many dehydration requirements, this degree of concentration is adequate. However, there are growing demands for higher concentrations, to obtain greater depressions of the dew point of gas streams. Substantially an additional one percent of reconcentration of the glycol type of desiccant meets these growing demands.

Basically, to reduce the water content of thermally reconcentrated liquid desiccant, the vapor equilibrium above the liquid phase must be shifted. If enough undersaturated vapor is available, this shift can be carried out above the surface of a desiccant body of any size. A small part of the stream of natural gas, dehydrated by the desiccant of the system, can be used to shift the vapor equilibrium above the surface of the desiccant. The desiccant, having been first reconcentrated by heat, is thereby further reconcentrated.

The present invention contemplates that heat-reconcentrated desiccant have its vapor equilibrium shifted by developing a vacuum above the surface of the heat-reconcentrated desiccant. The desiccant, heat-reconcentrated, is thereby additionally reconcentrated.

One of the first problems in employing the force of a vacuum to shift the vapor equilibrium above a body of liquid desiccant is to provide this environment when the desiccant is as warm as practical. The next problem is to expose as large a surface of the liquid desiccant as possible to the reduced pressure.

An object of the present invention is to shift the vapor equilibrium above the surface of a body of heat-reconcentrated liquid desiccant.

Another object of the present invention is to shift the vapor equilibrium above the body of liquid desiccant with a minimum of heat loss from the heat-reconcentrated liquid desiccant.

Another object is to isolate the portion of the liquid desiccant being heat-reconcentrated from the portion of heat-reconcentrated liquid desiccant having its vapor equilibrium shifted by the generation of a vacuum above its surface.

The present invention contemplates the provision of a vessel in which heat-reconcentration of liquid desiccant is carried out and a compartment within the vessel to which the heat-reconcentrated liquid desiccant is flowed for further reconcentration by generation of a vacuum above its surface.

Other objects, advantages and features of this invention will become apparent to one skilled in the art upon consideration of the written specification, appended claims, and attached drawings, wherein;

FIG. 1 is a diagrammatic representation of a complete system employing the liquid desiccant to dehydrate a natural gas stream; and FIG. 2 is a sectioned elevation of the desiccant reconcentrator and integral compartment in which vacuum stripping is carried out in accordance with the present invention.

General system

Referring to FIG. 1, there is shown a complete system for dehydrating a natural gas stream, using liquid desiccant, and embodying the present invention. As disclosed in FIG. 1, the various units of the system are shown in the conventional arrangement for bringing liquid desiccant into proper contact with the natural gas stream to be dehydrated. The liquid desiccant is then first heat-reconcentrated in the conventional manner and then further concentrated by the use of vacuum to further lower the water content of the heat-reconcentrated desiccant under the concepts of the present invention.

Contactor tower 10 is the starting point for analyzing the complete system. The wet natural gas is brought to tower 10 through conduit 11 connected into a lower section of the tower. The internal arrangement of tower 10 is conventional, the dried gas being withdrawn from the top of the tower through conduit 12.

The lean desiccant, for drying the gas, is inserted into tower 10 through conduit 13. After contact with the gas, the desiccant forms a collection 14 in the bottom of tower 10. The wet desiccant is drawn off through conduit 15 for reconcentration. The level of collection 14 is sensed by a float 16 which exerts a control over valve 17 to maintain the level of collection 14 and prevent this level from lowering to outlet conduit 15.

The wet desiccant, withdrawn through conduit 15, passes through valve 17 and is heat exchanged with reconcentrated desiccant in vessel 20. Vessel 20 primarily functions as a surge chamber for the liquid desiccant and doubles as a heat exchanger between the reconcentrated and wet desiccant. Conduit 15 conducts the wet desiccant into heat exchange coil 21 which is in direct contact with the volume of reconcentrated desiccant within vessel 20. Conduit 22 then conducts the warm rich desiccant to the reconcentrating equipment.

The reconcentrating equipment for the rich desiccant of conduit 22 is generally indicated at 25. FIG. 2 shows the integral arrangement of this equipment to better advantage. In general, FIG. 1 indicates the warm rich desiccant inserted into the reflux column of the reconcentrator after which heat is applied by burner 26 for the first stage of reconcentration. The second stage of reconcentration, involving the present invention, also takes place within unit 25 and the lean desiccant produced is removed through conduit 27.

Conduit 27 takes the hot reconcentrated desiccant to vessel 20 where it is heat exchanged with the cool rich desiccant from the bottom of tower 10. Conduit 28 then directs the cooled lean desiccant through pump 29. This cycle is completed by the insertion of this cool lean glycol into tower 10 through conduit 13. Disclosed in this manner, the system for bringing liquid desiccant into contact with the natural gas stream to be dehydrated, and reconcentrating the desiccant, is conventional. The present invention utilizes the force of sub-atmospheric pressure within 25 in a second stage of reconcentration of desiccant within unit 25.

Use of dry gas in the process

Assuming the dry natural gas stream in conduit 12 is at a pressure in the order of 800 lbs. per sq. in., regulator 31 receives a portion of the gas in conduit 12 through conduit 30 and reduces this pressure to the order of 90 lbs. per sq. in. in conduit 32. Part of this gas at 90 lbs. per sq. in. can be used in conduit 33 for the pilot gas in the level control of valve 17. Pressure regulator 34 reduces the 90 lbs. per sq. in. gas to the order of 15 lbs. per sq. in. for use as pilot gas.

The gas in conduit 32 is also taken through a regulator 35 for reduction to a pressure level which will render it useful in burner 26. The amount of this gas from regulator 35 which is consumed in burner 26 is determined by valve 36 as controlled by a temperature unit 37 in the desiccant being heated within unit 25.

Finally, a regulated portion of the gas of conduit 32 is introduced into unit 25 to drive water from the liquid desiccant which is also heat-reconcentrated in the unit. A regulator 38 reduces the 90 lbs. per sq. in. gas to 15 lbs. per sq. in. and a manual valve is set with the guidance of rotameter 39 to give the flow desired for the dry gas into the reconcentrator. The effect of dry gas from this source is more completely explained in connection with FIG. 2.

Level control

The liquid desiccant in the main, heated compartment of unit 25 is controlled to a predetermined level by regulation of a valve 40 by a level sensing device 41 which is mounted through the wall of the heated compartment. Desiccant is introduced into this compartment from conduit 22 and down the reflux tower and finally removed through conduit 42. The flow of desiccant through conduit 42 is regulated by the setting of valve 40. This system keeps the heating element covered by the desiccant at all times to maintain efficient heating of the desiccant. Since conduit 42 connects the heated compartment in which atmospheric, or slightly higher, pressure is carried to the smaller compartment in which sub-atmospheric pressure is carried, the liquid desiccant will be forced through conduit 42, across valve 40, by this pressure differential between the compartments.

A pump 43 is connected to the upper portion of the small, sub-atmospheric compartment by conduit 44. Pump 43 is powered by any available source of power to generate the vacuum on this small compartment, which sub-atmospheric pressure is required to carry out objects of the invention.

Undersaturated gas effect in the reconcentrator

The sectioned elevation of FIG. 2 illustrates the reconcentrating equipment 25 in most of its details. The unit is basically characterized by horizontally extended cylindrical vessel 50 with reflux column 51 mounted thereon. The operation of the reflux column is conventional and it is sufficient to generally indicate that the warm rich desiccant is passed down this column and into vessel 50 to form a body 52 in a relatively large, heated, compartment of the vessel 50.

Vessel 50 is divided, essentially, into two compartments. The first compartment 53 is relatively large and receives the desiccant to be reconcentrated by heat around heater tube 54 mounted therein. Heater 54 is submerged in the body 52 of liquid desiccant and the heat from the tube boils off a large percentage of the water which the desiccant has absorbed from the natural gas stream in tower 10.

Triethylene glycol is presently a common liquid desiccant and is usually elevated to a temperature in the order of 380 degrees F. This level of heating reconcentrates the glycol to the order of 98.5%. Converting to mol percent, we have a liquid composition as follows:

| | Mol percent |
|---|---|
| Triethylene glycol | 88.7 |
| Water | 11.3 |

This is the normal reconcentration of diluted triethylene glycol by heat alone. From available vapor-liquid equilibrium data for triethylene glycol, the vapor composition is then determined as approximately:

| | Mol percent |
|---|---|
| Triethylene glycol | 15 |
| Water | 85 |

In any vapor, mol percentage is a volume percentage. So the vapor above the reconcentrated glycol is actually 85% water vapor when reconcentrated by heat alone.

Gas, undersaturated with respect to water vapor, will shift the vapor composition above the heat-reconcentrated glycol to reduce the partial pressure of water. The gas which is introduced through regulator 38 into first compartment 53 serves this purpose. Specifically, conduit 55 introduces gas from conduit 32 into the bottom of compartment 53 so the gas can bubble up through glycol body 52 and into the vapor space above the liquid surface. If enough gas is introduced above glycol body 52, enough water will be drawn from the glycol to give a significant increase in concentration over the concentration which can be brought about by the use of heat alone.

Compartment 56

The glycol, concentrated by heat and the effect of gas above its surface, is introduced into compartment 56 which is relatively smaller than compartment 53. A wall 57 within vessel 50 physically divides the interior of the vessel into two compartments.

The body 58 of glycol is small in size, relative to body 52. While the level of body 52 is maintained by level control 41, the level of body 58 is maintained by the level of the inventory of glycol in vessel 20. The pump 29 is continuously removing the desiccant from vessel 20 and the level in vessel 20 is also the level in compartment 56 because they are connected together by conduit 27 and conduit 59.

The principle utilized by the present invention to reduce the water content of heat-reconcentrated desiccant is referred to as "vacuum-stripping." Essentially, the principle is employed when a vacuum is generated above a body of the glycol. This pressure reduction lowers the boiling point of the liquids and glycol and water vapors are boiled from the liquids in sufficient quantities to reduce the water content of the remaining liquids significantly. This principle is employed in a unique manner when a small collection of the heat and gas reconcentrated desiccant in compartment 56 is isolated. This isolation of small collection 58 then enables a vacuum effective enough to significantly reduce the water in the desiccant.

Getting the heat and gas reconcentrated glycol into a small body isolates the collection from the gases entrained by the glycol which was passed through the tower 10. Therefore, the pump generating the vacuum can be kept correspondingly small and yet remain effective to produce the required vacuum.

Additionally, the placing of this small collection 58 in heat exchange with large collection 52 facilitates vacuum generation which will readily boil the liquids. A minimum of heat is lost in he transfer from compartment 53 to compartment 56 and the heat exchange through wall 57 keeps the temperature of collection 58 close to its boiling point. The vacuum generated above the surface of the collection 58 is rendered the more effective to boil water from the liquids.

Another aid to effective vacuum stripping of water from the desiccant is the provision for spreading the liquid in a thin sheet within compartment 56. With the liquid mechanically spread in the vacuum generated within compartment 56, the water more readily disengages from the desiccant. Horizontal tray 60 is provided beneath the discharge end of conduit 42. The desiccant through conduit 42 then spreads upon this tray in a thin film to release the water therefrom.

The water and glycol vapors boiled from the liquids of body 58 in compartment 56 are then inserted into reflux column 51 through conduit 61. The water vapor will leave the column and the glycol will be refluxed back into compartment 53 where it will join body 42.

The desiccant, concentrated by heat, undersaturated gas and vacuum, is then flowed into vessel 20 through conduit 27. The level of this liquid in vessel 20 is the same height as the level of body 58 in compartment 56 because of this connection 27 and connection conduit 59. In effect, the two containers, so connected, form a U-tube, the concentrated glycol flowing from the compartment 56 leg to the vessel 20 leg. The use of this lean glycol in tower 10 then completes the cycle of the process.

Conclusions

Certain structures have been purposefully illustrated broadly to denote the suitability of alternate forms. Pump 43 is an excellent example. This pump 43 is simply a means to withdraw gaseous material from the top of compartment 56. An electric pump could be used. An ejector, powered by steam, could be used. No specific form for this pump, or means for powering it, is shown. Any number of specific forms would satisfactorily reduce the invention to practice.

The level control for value 40 is another general showing. It has ben explained why it is necessary to maintain the level in compartment 53. Any specific structure which will perform this function will enable the objects of the invention to be attained.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. A system for reconcentrating liquid desiccant including,
  a vessel into which rich liquid desiccant is conducted for reconcentration,
  a relatively large compartment in the vessel,
  a heater mounted in the large compartment and arranged to heat the rich desiccant conducted into the large compartment close to its deterioration temperature,
  a relatively small compartment mounted adjacent the large compartment and arranged in heat exchange relation with the large compartment while pressure isolated from the large compartment,
  means for conducting the thermally reconcentrated desiccant from the large compartment into the small compartment,
  a pump connected to the small compartment to withdraw water vapor and desiccant vapor in reducing the vapor pressure in the small compartment above the liquid desiccant and thereby cause water in the desiccant to vaporize,
  and a conductor connected to the small compartment for passing the thermally and vacuum reconcentrated desiccant to a point of use.

2. The system of claim 1 in which,
  a small supply of gas is provided which is under-saturated with respect to water vapor,
  and means connected to the large compartment for releasing the under-saturated gas in the large compartment to shift the vapor composition above the thermally reconcentrated desiccant so as to further reduce the water content of the desiccant.

3. The system of claim 1 in which,
  the means for conducting the thermally reconcentrated desiccant from the large compartment into the small compartment comprises,
  a conduit between the compartments,
  a valve in the conduit,
  and means responsive to the desiccant level in the large compartment and connected to the valve so as to operate the valve in flowing desiccant from the large compartment to maintain a predetermined desiccant level in the large compartment and differential pressure between the compartments.

4. The system of claim 1 in which,
  a heat exchange vessel is arranged to indirectly cool the hot reconcentrated desiccant by heat exchange with the rich desiccant conducted to the vessel for reconcentration.

5. The system of claim 1 in which,
  means is provided in the small compartment for receiving the thermally reconcentrated desiccant and spreading the desiccant over a surface to enable the water vapor to readily desingage from the desiccant.

References Cited

UNITED STATES PATENTS

| | | | |
|---|---|---|---|
| 378,843 | 2/1888 | Lillie | 159—13 X |
| 1,461,640 | 7/1923 | Wirth-Frey | 159—16 |
| 2,578,469 | 12/1951 | Goldsbarry et al. | 202—173 X |
| 3,182,434 | 5/1965 | Fryar | 55—32 |
| 3,206,916 | 9/1965 | Glasgow et al. | 55—32 X |

FOREIGN PATENTS

| | | |
|---|---|---|
| 610,314 | 5/1957 | Canada. |
| 365,945 | 7/1906 | France. |

NORMAN YUDKOFF, *Primary Examiner.*

J. SOFER, *Assistant Examiner.*